BEST AVAILABLE COPY

3 Sheets—Sheet 1.

J. HOVEY.

BAND CUTTER AND FEEDER FOR THRASHING MACHINES.

No. 11,499. Reissued June 4, 1895.

Witnesses
G. F. Downing
S. W. Foster

Inventor
J. Hovey
By M. D. Leggett & Co
Attorneys

3 Sheets—Sheet 2.

J. HOVEY.

BAND CUTTER AND FEEDER FOR THRASHING MACHINES.

No. 11,499. Reissued June 4, 1895.

Witnesses
G. F. Downing
Sw. Foster

Inventor
J. Hovey
By M. D. Leggett & Co
Attorneys

3 Sheets—Sheet 3.

J. HOVEY.

BAND CUTTER AND FEEDER FOR THRASHING MACHINES.

No. 11,499. Reissued June 4, 1895.

Witnesses
G. F. Downing
H. W. Foster

Inventor
J. Hovey
By M. D. Leggett & Co
Attorneys

UNITED STATES PATENT OFFICE.

JOSEPH HOVEY, OF FLORIDA, OHIO.

BAND-CUTTER AND FEEDER FOR THRASHING-MACHINES.

SPECIFICATION forming part of Reissued Letters Patent No. 11,499, dated June 4, 1895.

Original No. 524,484, dated August 14, 1894. Application for reissue filed March 5, 1895. Serial No. 540,677.

*To all whom it may concern:*

Be it known that I, JOSEPH HOVEY, a citizen of the United States, and a resident of Florida, in the county of Henry and State of Ohio, have invented certain new and useful Improvements in Grain-Separators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
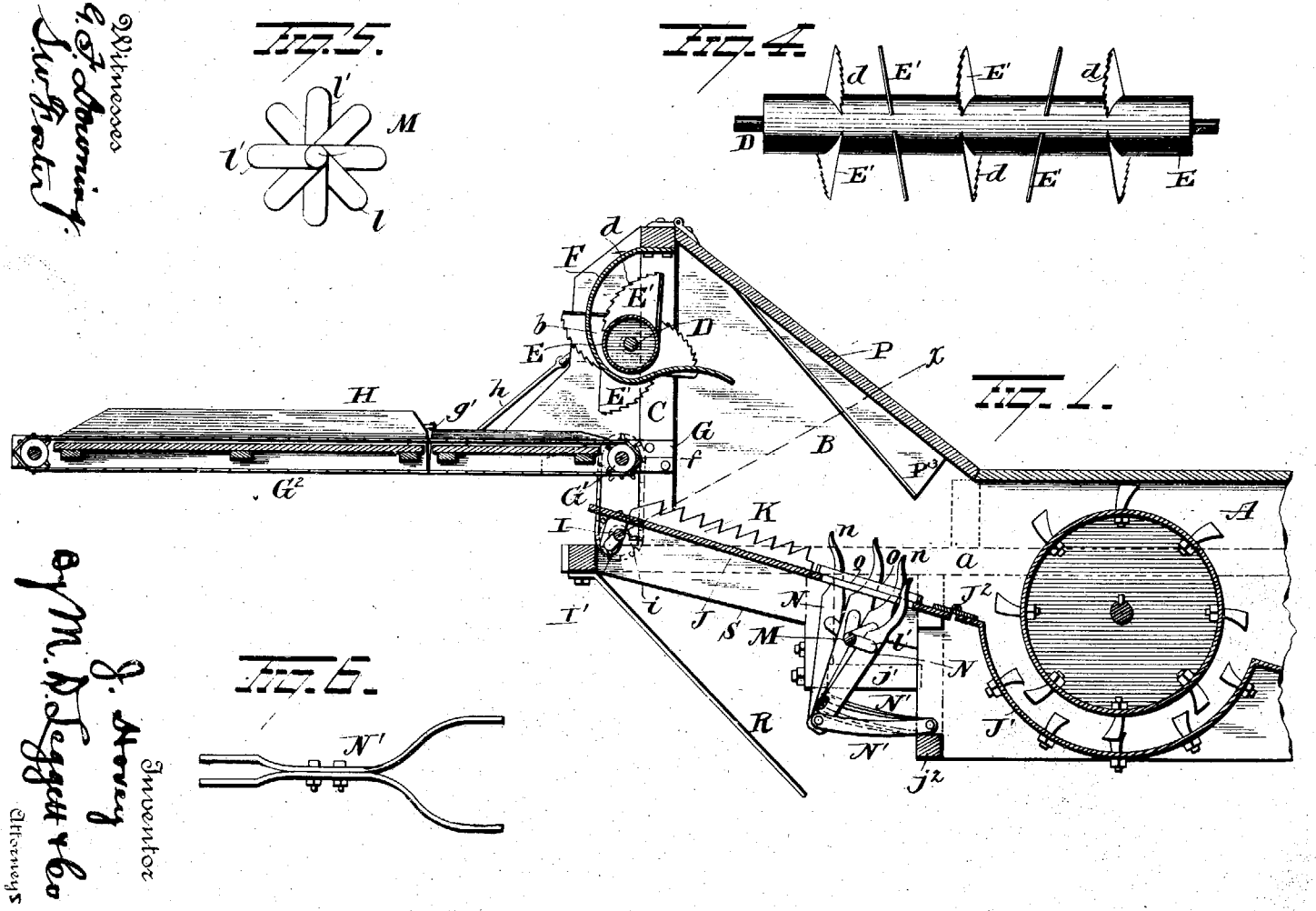
Figure 2:
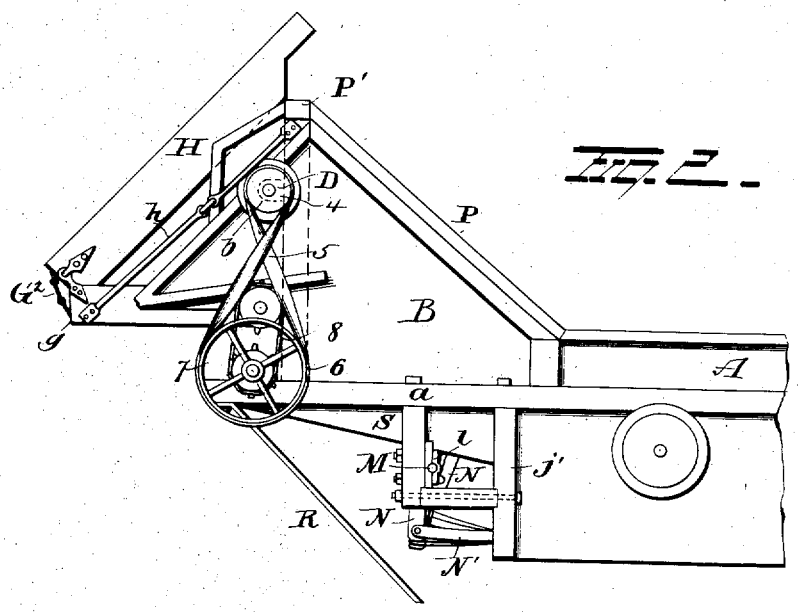
Figure 3:
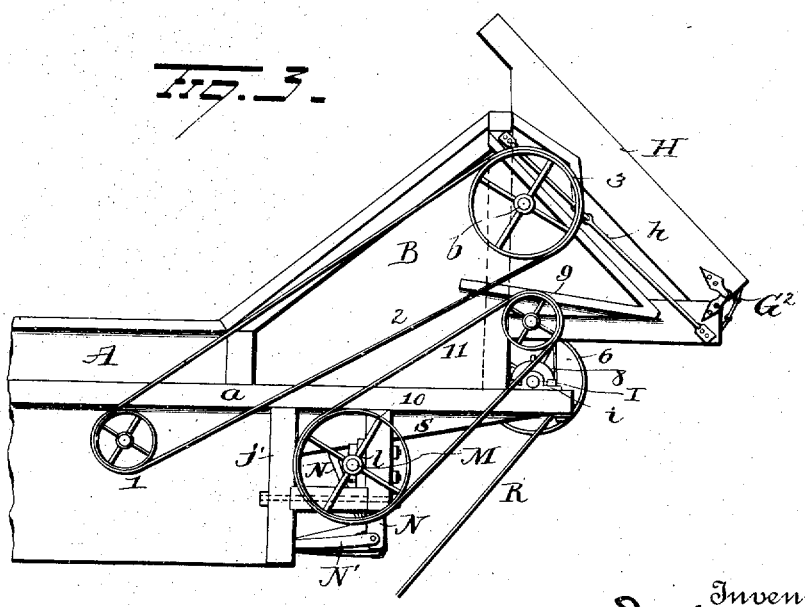
Figure 7:
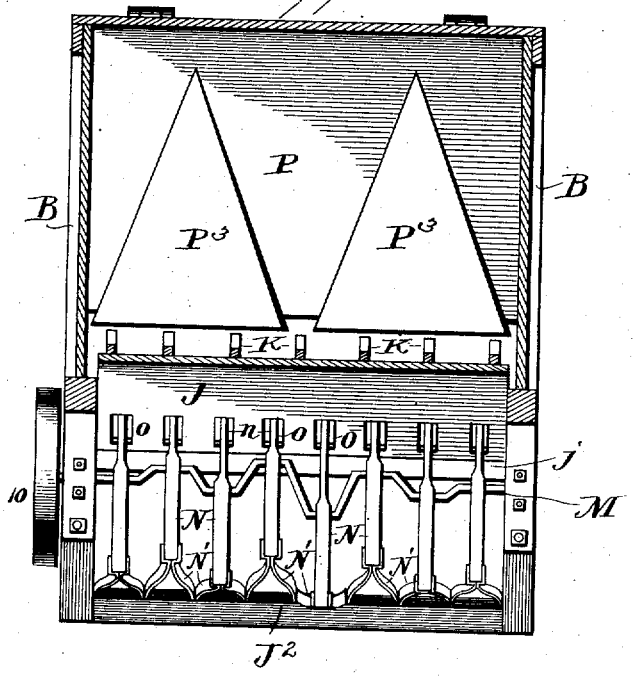
Figure 8:
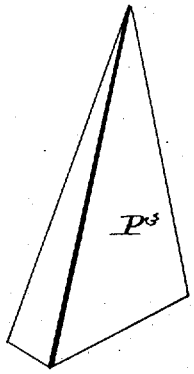

Figure 1 is a longitudinal vertical section of a portion of a thrashing-machine embodying my invention. Figs. 2 and 3 are side elevations of the same from opposite sides with the bundle-carrier folded back. Fig. 4 is a detail view of the band-cutter. Fig. 5 is an end view of the crank-shaft which actuates the vibratory arms N. Fig. 6 is a detail view of one of the rocking levers. Fig. 7 is a transverse section of Fig. 1, taken just back of the band-cutter and looking toward the cylinder; and Fig. 8 is a detail view of one of the ribs $P^3$.

This invention has relation to certain new and useful improvements in band cutters and feeders for thrashing machines; and has for its object the provision of practical and efficient means for severing the bands of the bundles as they pass from the bundle carrier to the vibratory bottom or table.

A further object of the invention is the provision of improved means for securing a uniform distribution and regular feed of the grain as it passes from the band cutters to the separator.

A further object is to improve the general construction and arrangement of parts, all as will hereinafter appear.

With these objects in view the invention consists in the novel construction and combination of parts, all as hereinafter described, and pointed out in the appended claims.

Referring to the accompanying drawings, the letter A designates the main frame of the separator, which may be in general of any ordinary construction; having the extension B of general triangular form, which forms the entire throat or mouth of the machine. Rising from the side sills *a*, *a*, of this extension one at each side, are two posts or uprights C. Secured to the faces of these uprights, near their upper ends, are bearings *b*, which support a transverse shaft D, carrying a hollow roll E. Upon this roll E, is fastened a series of knives E′, each of which is set somewhat obliquely to the axis of the roll, and at different angles to a plane passing therethrough. Each of said knives has a curved edge *d* which is of serrated or sickle character, and forms the cutting edge, its curvation being such that as it revolves it will act with a continuous drawing stroke. Secured to the frame above this roll E is a sheet metal guard F which extends downward and forward of said roll, and is bent rearwardly underneath the same to the rear thereof, as shown in Fig. 1. Slots are formed in said guard through which the knives work. This guard serves to prevent the grain from being wound around the roll as it is rotated.

G, G, designate brackets secured one to each of the posts or uprights C, below the bearings *b*, said brackets forming bearings for a transverse shaft G′ which carries wheels or pulleys *f* which drive the webs, belts or chains $G^2$ of the bundle carrier H, the discharge end of which is supported by said brackets G, G. Said bundle carrier is cut transversely at *g*′, and jointed so that it may be folded up back against the mouth B of the separator when desired. Attached to the discharge portion of the carrier, near said joint and also to the extension B, one at each side, is a rod or link *h*.

Secured to the sills *a*, *a*, just forward of the uprights C, are bearings *i*, in which is journaled a transverse crank-shaft I, which has a crank I′ at each end. Upon these cranks are journaled the upper, lateral portions of an inclined, vibratory bottom J whose rear end extends to the concave J′ of the separator, and rests and slides upon blocks *j*, secured to the depending frame *j*′. To close the gap formed by the vibration of the table or bottom J, between it and the concave J′, a hinged gate or extension $J^2$ is provided, said gate or extension being free to slide upon the flange of the concave upon the vibration of the bottom. Secured to the upper face of said table or bottom along its upper half are a series of ribs K, notched or toothed along their upper edges. These ribs upon the vibration of the table or bottom, serve to shake, loosen, and distribute the bundle after its band has been cut, and also to push or feed it forward and downward onto the regulating finger points.

The depending frames $j'$ above referred to are usually bolted to the under side of the sills $a$, $a$, or otherwise secured just forward of the cylinder L, and form the support for the regulating feed device now to be described.

M, designates a transverse crank-shaft journaled in bearings $l$ and having a series of cranks $l'$, preferably all projecting in different directions, or at different angles as seen in Fig. 5. In the drawings I have shown the shaft as provided with eight cranks, but a greater or less number may be employed. Journaled on each of said cranks is an arm N, loosely connected at its lower end portion to the end portion of a rocking lever N′, which is fulcrumed upon a transverse rod or bar $j^2$, a series of such levers being provided, one for each of the arms N. The upper end portions of said arms N are reduced in size, forming elongated regulating points $n$ which project up through elongated slots $o$ in the table or bottom J, said slots having raised guards O to prevent the grain falling through. The cranks $l'$ have a stroke of about four inches, and the arms N are journaled thereon. Upon the rotation of the shaft M, these arms are given a vibratory oscillating movement, causing their upper portions to play back and forth in the slots $o$. The cranks $l'$ all being at different angles, it follows that no two of the arms N will be in the same position at the same time, and the result of this arrangement in connection with the peculiar movement of each, I find to be very effective in regulating the feeding of the grain evenly to the cylinder. The rocking levers N′, as shown in Fig. 6 are preferably forked at one end to embrace the arms N, and at the other end to give them a wide bearing upon the fulcrum rod.

P, designates the top lid or cover of the feeding chamber which is hinged at its upper forward edge to a cross-piece P′ connecting the posts or uprights C. On the under face of said lid or cover are triangular ribs $P^3$, widest and thickest at their lower ends, their upper ends terminating short of the upper end of the lid or cover. The purpose of these ribs is to aid in breaking up and distributing the bundles.

The vibratory bottom or table may be raised to the position indicated by the dotted lines X—Fig. 1, giving sufficient room to permit a man to work at the cylinder.

R, R, designate brace rods from the under side of the forward end of the sills $a$, $a$, to the bolster of the separator. S, S, are side guards for the vibratory table.

The various parts may be driven as follows:—On one end of the cylinder shaft is a pulley 1 from which runs a belt 2 to a large pulley 3 on one end of the shaft D which carries the cutter-roll E. On the opposite end of the shaft D is a pulley 4 connected by a cross-belt 5 with a pulley 6 on the crank shaft I. Behind the pulley 6 is a sprocket wheel 7 which drives the shaft G′ by means of a chain-belt 8. Upon the other end of the shaft G′ is a pulley 9, which drives the crank shaft M by means of a pulley 10 thereon and a connecting belt 11.

It will be observed that pulley 10 is of larger size than pulley 9 and consequently the speed of the shaft M is lower than that of shaft G′ on which pulley 9 is secured.

The operation of the various parts is believed to be fully apparent from the above description.

Having thus described my invention, what I claim as new, and desire to secure by Letters Patent, is—

1. In a feeder for grain separators, the combination with an inclined vibratory table having slots, of a transverse shaft having crank arms disposed at different angles, arms connected with the cranks of the crank shaft, regulating points at the free ends of said arms, projecting through the slots in the table and devices for causing the crank shaft to rotate so as to vibrate the regulating points at a slower rate of speed than the speed of the grain in its passage over the table, whereby to regulate the feed of the grain from the table to the thrashing mechanism, substantially as set forth.

2. In a feeder for grain separators, the combination with the transverse crank shaft I, the inclined movable feeder table, the shaft journaled underneath the lower portion of said table and having a series of cranks at different angles, the arms journaled upon said cranks, and terminating at their upper portions in points projecting through slots in said table, and rocking levers fulcrumed on the frame and pivotally connected one to the lower portion of each of said arms, substantially as specified.

3. In a feeder for grain separators, the combination of the forwardly extended sills $a$, $a$, the enlarged mouth portion forming the feeder chamber supported upon said sills, the uprights C, C, supported upon the forward portion of said sills, the band-cutter journaled between said uprights and having a series of serrated cutters, the inclined cover to the feeding chamber to the rear of said band cutter, and angular tapering ribs attached to the under side of said cover, said ribs having their narrower portions adjacent to the said cutter, substantially as specified.

4. In a feeder for grain separators, the combination with the transverse crank-shaft I, the inclined feeder table journaled at its upper end upon the cranks of said shaft, and at its lower end free to slide upon supports therefor, the notched ribs upon the upper portion of said table, the shaft journaled underneath the lower portion of said table and having a series of cranks at different angles, the arms journaled upon said cranks, and terminating at their upper portions in points projecting through slots in said table, and rocking levers fulcrumed on the frame and pivotally connected one to the lower portion of each of said arms, substantially as specified.

5. In a band cutter and feeder for grain separators, the combination of the separator frame having the enlarged triangular mouth portion constituting the feeding chamber, the bundle carrier supported from said frame, the cutter roll journaled at the upper forward portion of said frame, and having a series of knives provided each with a serrated or sickle edge, the crank shaft journaled below said roll, the vibratory table hung at its forward end upon said crank-shaft, and the vibratory feeder fingers working in slots in the lower, rear portion of said table, substantially as specified.

Signed at Florida, Henry county, Ohio, this 7th day of February, 1895.

JOSEPH HOVEY.

Witnesses:
E. D. HALL,
WM. WEAVER.